United States Patent
Räsänen

(10) Patent No.: US 6,351,470 B1
(45) Date of Patent: Feb. 26, 2002

(54) ADAPTING THE FIXED NETWORK PROTOCOLS TO A MOBILE COMMUNICATIONS NETWORK

(75) Inventor: Juha Räsänen, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/068,281
(22) PCT Filed: Nov. 6, 1996
(86) PCT No.: PCT/FI96/00598
  § 371 Date: Sep. 29, 1998
  § 102(e) Date: Sep. 29, 1998
(87) PCT Pub. No.: WO97/17790
  PCT Pub. Date: May 15, 1997

(30) Foreign Application Priority Data

Nov. 7, 1995 (FI) .................................................. 955355

(51) Int. Cl.[7] .................................................. H04J 3/16
(52) U.S. Cl. ........................................ 370/465; 455/422
(58) Field of Search ................................ 370/254, 264, 370/310, 329, 341, 464, 465, 466, 328; 455/422, 425, 433, 434, 435, 437, 439

(56) References Cited

U.S. PATENT DOCUMENTS

| 4,891,783 | A |   | 1/1990  | Aritaka et al. |         |
|-----------|---|---|---------|----------------|---------|
| 5,282,194 | A |   | 1/1994  | Harley et al.  |         |
| 5,430,709 | A |   | 7/1995  | Galloway       |         |
| 5,903,833 | A | * | 5/1999  | Jonsson        | 455/417 |
| 5,920,545 | A | * | 7/1999  | Rasanen        | 370/232 |
| 5,920,812 | A | * | 7/1999  | Palvianen      | 455/417 |
| 6,073,018 | A | * | 6/2000  | Sallberg       | 370/329 |
| 6,167,264 | A | * | 12/2000 | Palvianen      | 455/433 |

FOREIGN PATENT DOCUMENTS

| DE | 41 07 742 A1 | 9/1992 |
| EP | 0 478 175 A1 | 4/1992 |
| EP | 0 503 487 A2 | 9/1992 |

OTHER PUBLICATIONS

CCITT (International Telegraph and Telephone Consultative Committee), vol. 110, Data Communication over the Telephone Network, "Support of Data Terminal Equipment with V–Series Type Interfaces by an Integrated Services, Digital Network", p. 1–58.

CCITT (International Telegraph and Telephone Consultative Committee), vol. 120, Data Communication over the Telephone Network, "Support by an ISDN of Data Terminal Equipment with V–Series Type Interfaces with Provision for Statistical Multiplexing", p. 1–36.

(List continued on next page.)

*Primary Examiner*—Douglas Olms
*Assistant Examiner*—Ricardo M. Pizarro
(74) *Attorney, Agent, or Firm*—Altera Law Group, LLC

(57) ABSTRACT

The invention relates to an interworking function apparatus (IWF), a method and an arrangement for establishing a mobile-terminating call in a mobile communications network when the call is received from a calling party via a fixed network without any signalling support which provides information on the protocol employed by the calling party. In the invention, a service is assigned only one directory number, which is common to all the protocols employed by the service. The protocol identifier in a service definition linked with this directory number has a neutral (undefined) value or may be interpreted as neutral. The IWF, upon receiving the neutral RA parameter (Step 2), is switched onto the line and monitors a traffic channel received from the fixed network in order to identify the protocol employed by the calling terminal equipment (Steps 54–57). After identifying the protocol, the IWF is configured according to the identified protocol (Steps 58–60 or 61–63), and data transfer may begin (Step 64).

8 Claims, 4 Drawing Sheets

OTHER PUBLICATIONS

Moule and Pautet, *The GSM System for Mobile Communications*, p. 216, 232–234, 249–259.

Moule and Pautet, *The GSM System for Mobile Communication* (Draft), p. 423–431.

European Telecommunication Standard, European Digital Cellular Telecommunications System (Phase 2); Bearer Services (BS) Supported by a GSM Public Land Mobile Network (PLMN), p. 1–13.

International Telecommunication Union–Telecommunication Standardization Sector, Data Communication Over the Telephone Network vol. 24, "List of Definitions for Interchange Circuits between Data Terminal Equipment (DTE) and Data Circuit—Terminating Equipment" (DCE), p.1–17.

* cited by examiner

ADAPTING THE FIXED NETWORK PROTOCOLS TO A MOBILE COMMUNICATIONS NETWORK

FIELD OF THE INVENTION

The invention relates to a method and an arrangement for establishing a mobile-terminating call in a mobile communications network when the call is received from a calling party via a fixed network without any signalling support for carrying information on the protocol employed by the calling party.

BACKGROUND OF THE INVENTION

Present-day mobile communications systems provide the subscribers, in addition to standard speech transmission, with a variety of data transfer features. The data services usually employ a certain specified communication protocol within the mobile network. In the pan-European digital mobile communication system GSM (Global System for Mobile Communications), for instance, a CCITT V.110-based, UDI coded rate adaptation protocol is employed, and, in addition, a radio link protocol (RLP) is employed in non-transparent services. A digital connection from a mobile network to a fixed network, such as an ISDN (Integrated Services Digital Network) or a public switched telephone network PSTN, may employ different kinds of protocols. Examples of such protocols are the rate adaptation protocols CCITT V.110 and V.120 of the ISDN network.

An important feature related to data transfer services are adaptation functions for adapting the internal data connection within the mobile network to the protocols employed by the terminal equipments and other telecommunications networks. Typically, the adaptation functions are a Terminal Adaptation Function TAF at the interface between a mobile station and a data terminal connected thereto, and an Interworking Function IWF at the interface between the mobile network and another telecommunications network.

Mobile networks are expected to provide a wide range of data services of various kinds which support the commonest data transfer protocols of fixed telecommunications networks. Consequently, a separate IWF is also required for each data transfer protocol. The mobile network must know which data transfer protocol the terminal equipments wish to employ in each call in order that it would be able to select the correct IWF.

In a mobile-originating call (MOC) the mobile station signals the information on the protocol it wishes to be employed towards the fixed network and the called party. In GSM mobile communications system, for instance, the information on the desired protocol is in a Bearer Capability Information Element (BCIE) in a setup message. On the basis of this information, the IWF is configured to provide a suitable interworking function between the mobile network and the telecommunications network. In case signalling that supports transmitting the protocol information is employed on the entire connection between the mobile network and the called party, the information is also transmitted to the called party. The required signalling support is provided e.g. in ISDN networks (Integrated Services Digital Network). If such signalling support is not provided, it is the responsibility of the calling subscriber to select the correct protocol, that is, the calling subscriber must know the protocol of the called subscriber and select the protocol of the IWF accordingly. Signalling support is not available e.g. in the conventional public switched telephone network PSTN.

A mobile-terminating call (MTC) is more problematic. In case the required signalling support is available on the entire connection between the calling party and the mobile network, the protocol parameters of the calling subscriber are transmitted to the mobile network, which may configure the IWF according to them. In practice, however, signalling support is not always available over the entire connection. This is the case, for instance, when a call originates from the PSTN or has been routed via the PSTN. When the signalling support is not available, the mobile network should be able to obtain the information on the protocol required by the call in some other way.

A prior art approach to the problem is a Multi Numbering Scheme, in which a mobile subscriber has as many directory numbers (MSISDN) as he has different services to which he wishes to receive incoming calls. In accordance with the multinumbering scheme, the calling subscriber dials the directory number of the mobile subscriber according to the desired service. In the GSM system, the services of the subscribers are determined in a subscriber's home location register (HLR), in which other subscriber information is also stored permanently. The HLR is also used for storing information on the mapping between the directory numbers and the services of the subscribers. In the HLR, a specific BCIE element indicating the type of a call and the network resources and the protocol required for the call is also linked with the Mobile Subscriber ISDN Number (MSISDN). The IWF may be configured according to this information. According to the present recommendations, a subscriber has a separate MSISDN number for the V.110 protocol and a separate MSISDN number for the V.120 protocol.

For the network operator and the mobile subscribers, such a vast number of services causes confusion and trouble. In order for the mobile subscriber to be able to carry out and receive calls requiring different protocols, he must subscribe to several different bearer services from the network operator. From the point of view of the network operator, it is in turn problematic that each user should require a plurality of directory numbers, which wastes the number space of the network. Furthermore, determining the services in the network databases consumes database capacity. The multinumbering scheme is thus a working, yet a poor solution.

SUMMARY OF THE INVENTION

It is an object of the invention to provide a method and arrangement that allow protocol adaptation between the mobile communications system and the fixed network more efficiently as compared with the present multinumbering scheme in a case where no signalling support is provided, thus saving the number space and database capacity.

This is achieved with a method for establishing a mobile-terminating data call when the call is received from the calling party via a fixed network without signalling support carrying the information on the protocol employed by the calling party. The method is characterized by receiving a call to a directory number of a subscriber, said directory number being assigned to a data service employing two or more alternative protocols towards the fixed network, retrieving from the subscriber data a service definition linked with said directory number, the protocol parameter of said definition having a neutral value or a value that is interpreted as neutral, assigning an interworking function resource in accordance with said service definition, omitting the definition of the protocol due to said neutral value or the value that is interpreted as neutral, monitoring by means of the assigned interworking function resource the traffic channel received from the fixed network, identifying the protocol employed by the calling party on the basis of signalling characteristic thereof, configuring said assigned interworking function resource to employ said identified protocol towards said calling party.

The invention also relates to providing an arrangement for establishing a mobile-terminating data call in a mobile communications network when the call is received from the calling party via a fixed network without signalling support carrying the information on the protocol employed by the calling party. The arrangement is characterized by the subscriber database of the mobile communications network having one directory number defined for a subscriber's data service that employs two or more alternative protocols towards the fixed network, the protocol parameter of a service definition linked with said directory number having a neutral value or a value that is interpreted as neutral, the mobile network being arranged, in a mobile-terminating call made to said directory number, to assign an interworking function apparatus according to the service definition, but to omit the configuration of the protocol employed towards the fixed network due to the neutral value of said protocol parameter or the value that is interpreted as neutral, said assigned interworking function apparatus (IWF) being arranged to monitor a traffic channel received from the fixed network, to identify the protocol employed by the calling party (TE) on the basis of signalling characteristic thereof, and to configure itself to employ said identified protocol towards said calling party.

It is yet another aspect of the invention to provide an interworking function apparatus for achieving a protocol adaptation between a mobile communications network and a fixed network when a call is received from the calling party via the fixed network without any signalling support carrying the information on the protocol employed by the calling party. The apparatus is characterized by the interworking function apparatus being arranged, in a mobile-terminating call, to assign interworking function resources according to the service definition obtained from the subscriber database, but to omit the configuration of the protocol employed towards the fixed network if the protocol parameter of said service definition has a neutral value or a value that is interpreted as neutral, the interworking function apparatus being arranged to monitor a traffic channel received from the fixed network, to identify the protocol employed by the calling party on the basis of signalling characteristic thereof, and to configure said assigned interworking function resources to employ said identified protocol towards said calling party.

In the invention, a service is assigned only one directory number which is common to all the protocols employed by the service. In the service definition linked with this directory number, the protocol identifiers are neutral (undefined) in value or interpreted as neutral. When the interworking function (IWF) of the mobile network receives, in case of a mobile terminating data call, a protocol identifier which is neutral or interpreted as neutral, it does not attempt, after being switched to the line, to synchronize itself towards the fixed network according to any protocol, but it monitors the traffic channel received from the fixed network in order to identify the protocol employed by the calling terminal equipment. The IWF, however, synchronizes the internal data connection within the mobile network in the specified way in the direction of the mobile station. After identifying the protocol of the calling terminal equipment, the IWF starts to operate in the manner required by the identified protocol. After setting up a data link, the IWF signals the status of the traffic channel to the mobile station in the usual way, and data transmission may begin.

Identifying the protocol is based on detecting synchronization or signalling characteristic thereof. The CCITT V.110 protocol may be identified by means of a V.110 synchronization frame. After identifying the V.110 synchronization frame, the IWF itself starts transmitting V.110 synchronization frames to the fixed network. The CCITT V.120 protocol may also be identified by means of a V.120 frame flag, in addition to which the identification may be confirmed by means of a link setup message. After identifying a V.120 frame flag, the IWF itself starts transmitting frame flags to the fixed network, and after identifying the link setup message, it acknowledges the message etc.

BRIEF DESCRIPTION OF THE DRAWINGS

In the following, the invention will be explained by means of preferred embodiments with reference to the attached drawings, in which.

The present invention may be used in all digital mobile communication systems in which data services employ two or more kinds of different protocols towards the fixed network, such as ISDN or PSTN.

The present invention is particularly well suited for data transmission applications in the Pan-European digital mobile communication system GSM (Global System for Mobile Communications) and other GSM-based systems, such as DCS1800 (Digital Communication System), and the digital cellular system PCS (Personal Communication System) in the USA. The invention will be disclosed below by way of example of the GSM mobile communications system. The structure and operation of the GSM system are well known to a person skilled in the art, and they are specified in the ETSI (European Telecommunications Standards Institute) GSM specifications. Reference is also made to "GSM System for Mobile Communication" by M. Mouly and M. Pautet, Palaiseau, France, 1992; ISBN 2-9507190-0-7.

Figure 1:
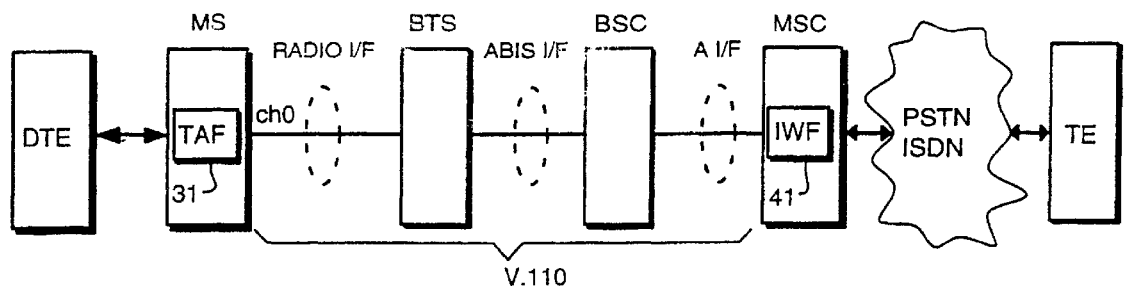
FIG. 1 illustrates a mobile communications system in which the present invention may be applied.

The basic structure of the GSM system is illustrated in FIG. 1. The GSM structure consists of two parts: a base station system BSS and a network sub-system (NSS). The BSS and the mobile stations MS communicate over radio connections. In the BSS, each cell is served by a base station BTS. A group of base stations is connected to a base station controller BSC, whose purpose is to control the radio frequencies and channels used by the BTS. The BSCs are connected to a mobile services switching center MSC. Specific MSCs are connected to other telecommunication networks, such as the PSTN, and comprise gateway functions for calls to and from these networks. These MSCs are known as gateway MSCs (GMSC).

There are two main classes of databases, associated with call routing. A home location register HLR permanently or semi-permanently stores the subscriber data of all the subscribers of the network, including information on the services the subscriber may have access to, and on the subscriber's current location. The second register type is a visitor location register VLR. The VLR is usually associated with one MSC, but it may, however, serve several MSCs. It is common practice that the VLR is integrated into the MSC. The integrated network element is known as a visitor MSC (VMSC). Whenever the mobile station MS is active (registered and capable of making or receiving calls), the majority of the mobile subscriber information concerning the MS and stored in the HLR is copied to the VLR of the particular MSC in whose service area the MS is located.

Still referring to FIG. 1, a data link is established in the GSM system between a mobile station MS network terminal TAF (Terminal Adaptation Function) 31 and a network adaptor IWF (Interworking Function) 41 in the mobile communication network. In the GSM network, the data link in data transfer is a V.110 rate adapted, V.24 interface compatible, UDI coded digital Full Duplex connection. In this connection, the V.110 connection is a digital transmission channel originally developed for ISDN (Integrated Services Digital Network). The transmission channel adapts to the V.24 interface and also provides a possibility for transfer of V.24 statuses (control signals). The CCITT recommendation for a V.110 rate-adapted connection is specified in the recommendation CCITT Blue Book: V.110. The CCITT recommendation for a V.24 interface is disclosed in the CCITT Blue Book: V.24. In non-transparent data services, a radio link protocol RLP is also employed. The terminal adaptor TAF adapts a data terminal equipment DTE connected to the MS for the V.110 connection, which is established over a physical connection using one or more traffic channels. The IWF couples the GSM V.110 connection to another V.110 or V.120 network such as an ISDN or another GSM network, or to another transit network, such as the public switched telephone network PSTN. The CCITT recommendation for a V.120 rate-adapted connection is specified in the recommendation CCITT White Book: V.120.

As it was explained above, modern mobile communication systems support different kinds of teleservices and bearer services. The bearer services of the GSM system are specified in the specification GSM 02.02 Version 4.2.0, and the teleservices in the specification GSM 0.0.3 Version 4.3.0.

Figure 2:
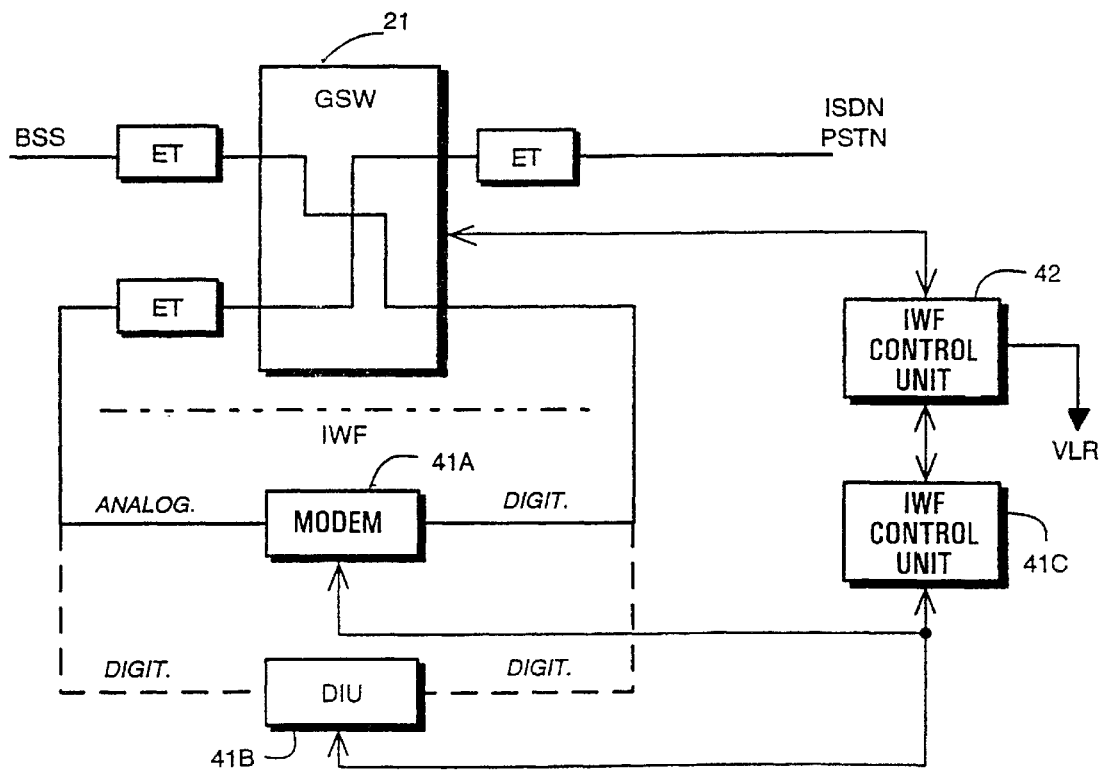
FIG. 2 is a schematic block diagram of a mobile services switching centre provided with an interworking function apparatus IWF.

The network adaptor IWF is often placed at the MSC. FIG. 2 illustrates a network adaptor apparatus placed at the MSC, carrying out the adapting to the PSTN and the data services of the ISDN network. For adapting to the PSTN, an ISDN 3.1 kHz audio service or another GSM network, the IWF comprises a group of baseband data modems 41A, which also include a rate adaptor. The modems 41A are autobauding modems capable of handshaking any data rate supported by the GSM system between 300–9600 bit/s, or for HSCSD data services even higher transfer rates, such as 14.4–28.8 kbit/s. Data modem 41A is used e.g. when a data connection is required via an analog PSTN to a data terminal TE of a fixed network or to an ISDN network with a 3.1 kHz audio service. In such a case, there is a similar data modem at the other end of the analog modem connection. There may be any required number of data modems, although FIG. 2 only shows one modem 41A for the sake of clarity. The analog side of the modem 41A is connected via an exchange termination ET and the digital side is connected directly to a group switch GSW21 of the MSC. In addition, digital transfer links transmitted via the exchange terminations to the base station systems BSS are coupled to the group switch 21. Furthermore, via the exchange terminations ET, the transmissions channels of other telecommunication networks, such as ISDN or PSTN, are coupled to the group switch 21. The interworking function apparatus IWF of FIG. 2 further comprises, for adapting to the Unrestricted Digital Information service UDI of the ISDN network, a data interface unit DIU 41B which comprises a rate adaptor. The DIU is used in GSM data calls to adapt the user data, rate adapted according to the V.110 or V.120 protocol, from the ISDN, as well as the status and control information according to the V.110 or V.120 protocol to the GSM traffic channel, and in the opposite direction, the user data from the GSM traffic channel as well as the status and control information to the V.110 and V.120 frame structure of the ISDN. The ISDN side of the DIU 41B is connected via the exchange terminal ET, and the GSM side directly to the group switch GSW21. Although only one DIU 41B is shown in FIG. 2, there may be any number of them depending on the capacity requirements. The group switch GSW21 and the interworking function apparatus IWF, as well as data call establishing, maintaining and releasing are all controlled by a call control 42. The operation of the IWF is controlled by an IWF control unit 41C which, under control of the call control 42, connects a network adaptor, i.e. the modem 41A or DIU 41B, required by the bearer service used by a particular data call to the data connection. In FIG. 2, a solid line illustrates connecting the modem 41A, and a broken line illustrates connecting the DIU 41B. As an example of a mobile services switching center comprising such a network adaptor apparatus, the Nokia Telecommunication Ltd DX200 MSC can be mentioned.

As stated above, a mobile subscriber may traditionally have been entitled to different teleservices and bearer services each having a separate directory number MSISDN. In other words, each subscriber has had several MSISDN numbers. In addition, it has been necessary to determine every teleservice and bearer service of every subscriber in the subscriber's HLR in connection with other subscriber data, and to transfer them to the VLR. In the subscriber data, every MSISDN number is associated with a GSM system BCIE value, either directly or by means of an index pointing to a BCIE values chart. The BCIE is an information element used by the GSM system to transfer information on all the network requirements related to the call, such as transfer rates, number of data and end bits, etc. The BCIE is described in, for example, the GSM specification 04.08, version 4.5.0, pp. 423–431.

In the invention, a service is assigned only one directory number MSISDN, which is common to all the protocols employed by the service. The service definition linked with this MSISDN number is stored in the HLR along with the other subscriber data. In this service definition, a GSM BCIE is linked with the MSISDN number. In the GSM BCIE the parameter RA (Rate Adaptation) that determines the rate adaptation protocol in the GSM BCIE has a neutral (undefined) value, or a value that may be interpreted as neutral. Presently, the parameter RA may determine the following cases: no rate adaptation, V.110/X.30 rate adaptation, X.31 flag stuffing, V.120. Furthermore, there are free values one of which may be selected as the neutral value in accordance with the invention. A neutral value of the parameter RA herein generally refers to a value which does not define any protocol for the IWF, but, as a result of which the MSC/IWF attempts to identify the protocol of a terminal equipment of a fixed network from the traffic channel. The MSC/IWF may also be arranged to interpret specific values of the RA parameter, such as V.110 and V.120, as neutral.

When the IWF obtains in connection of a terminating data call a neutral value of the RA parameter or a value that may be interpreted as neutral, it does not attempt to operate according to any protocol after switching to the line, until it has identified, by monitoring the traffic channel from the fixed network, the protocol employed by the calling terminal equipment.

In the following, establishing a MT call according to the invention will be explained with reference to FIGS. 3A–C and 4. In the example, the service is an asynchronous UDI service, the different protocols employed by the service being V.110 and V.120. It must be noted, however, that the invention is not limited to these protocols, but it generally applies to any protocol.

Figure 3A:
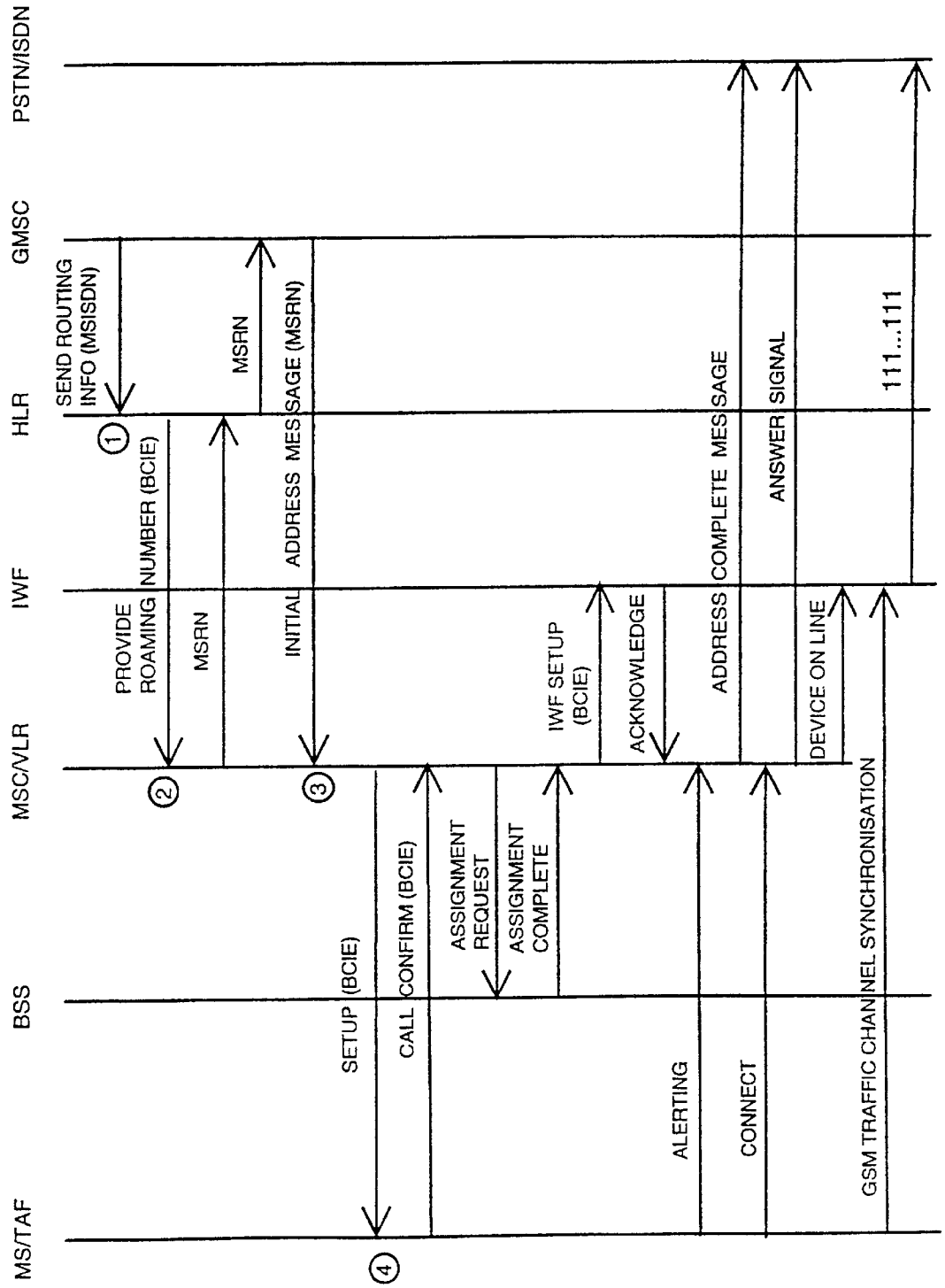
FIG. 3A is a signalling diagram illustrating the first part of call establishment in a mobile-terminating UDI call which is made to an MSISDN number of an asynchronic service of a mobile station from a terminal equipment of a fixed network.
Figure 3B:
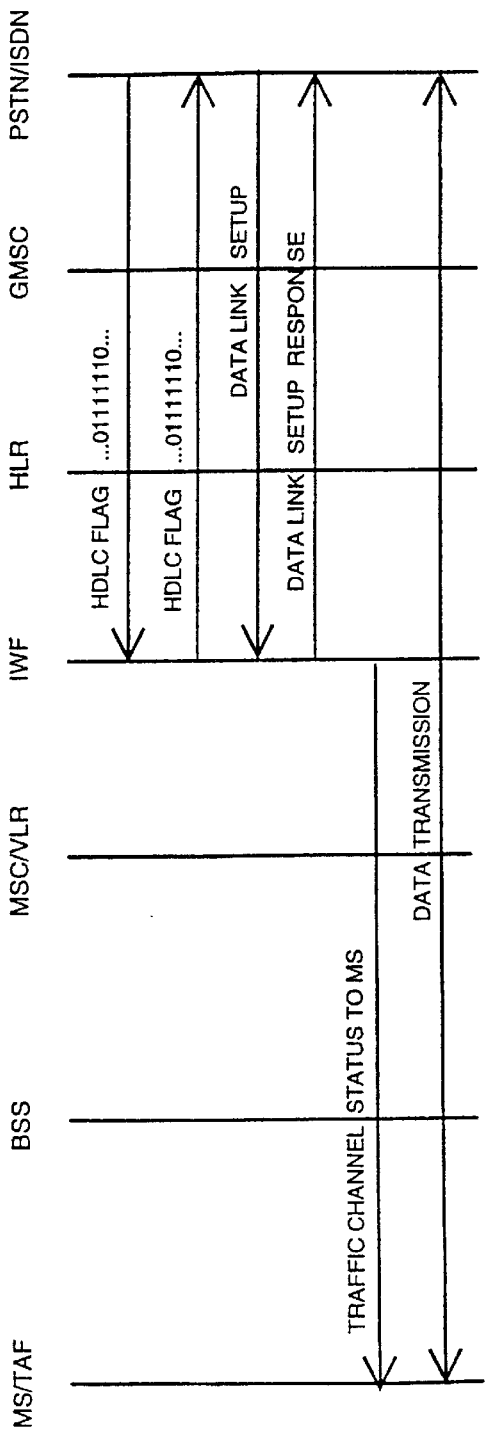
FIG. 3B is a signalling diagram illustrating the latter part of call establishment shown in FIG. 3A, the protocol of the terminal equipment being V.120.
Figure 3C:
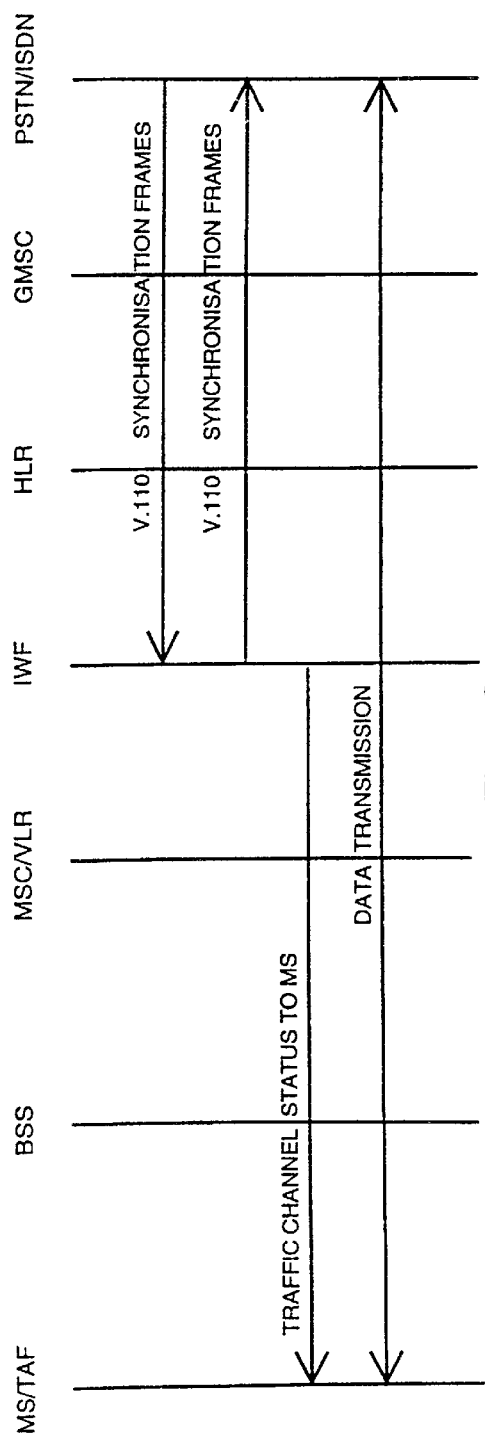
FIG. 3C is a signalling diagram illustrating the latter part of call establishment shown in FIG. 3A, the protocol of the terminal equipment being V.110.

The signalling diagrams of FIGS. 3A–C are related to an exemplary case in which a mobile-terminating (MT) UDI call is made from a fixed terminal equipment TE to the MSISDN number of a mobile subscriber, said number being assigned to an asynchronous data service of the subscriber. In such a case, the call is received in the mobile network from an ISDN network, but signalling support is not available on the entire connection between the mobile network and the terminal equipment TE for transmitting the protocol information. The first part of call establishment is illustrated in FIG. 3A, and it is similar for both protocols. FIGS. 3B and 3C illustrate the latter part of call establishment in a case where the terminal equipment TE is employing V.120 protocol and V.110 protocol, respectively.

In FIG. 3A, an IAM message (Initial Address Message) is transmitted from an ISDN network to a gateway MSC (GMSC) of the mobile network in a call made to a directory number MSISDN of a mobile subscriber's asynchronous service. The GMSC carries out a routing information request Send Routing Info to the subscriber's HLR, which is determined on the basis of the called MSISDN. Along with the routing information request, the subscriber's MSISDN number is also transmitted. The HLR retrieves from the subscriber data the GSM BCIE linked with the called directory number MSISDN. In this GSM BCIE the parameter ITC (Information Transfer Capability) has the value UDI and the parameter RA has a neutral value, or a value that may be interpreted as neutral, e.g. V.110. The HLR then transmits the VLR a roaming number request Provide MSRN containing said GSM BCIE. The VLR stores the GSMBCIE and allocates the call a roaming number MSRN. The MSRN is transmitted to the HLR, which forwards it to the GMSC. The GMSC routes the call on the basis of the roaming number MSRN to the MSC in the area of which the mobile subscriber MS is located. The MSC then requests information from the VLR for establishing a mobile-terminating call on the basis of the roaming number MSRN. On the basis of the MSRN, the VLR retrieves the BCIE which was previously received from the HLR, and transmits it to the MSC. Following this, the MSC transmits the MS a call set-up message 'setup', which also contains the GSM BCIE. The MS replies with a 'call confirm' message. Subsequently, the MSC request the BSS with an 'Assignment Request' message to assign the required radio channels, and the BSS acknowledges with an 'Assignment Complete' message. Thereafter, the MSC allocates the required IWF resources by transmitting the IWF an 'IWF Setup' message, which also contains the GSM BCIE obtained from the VLR. At this stage, the operation of the IWF according to the invention begins, illustrated by means of the block diagram in FIG. 4.

Figure 4:
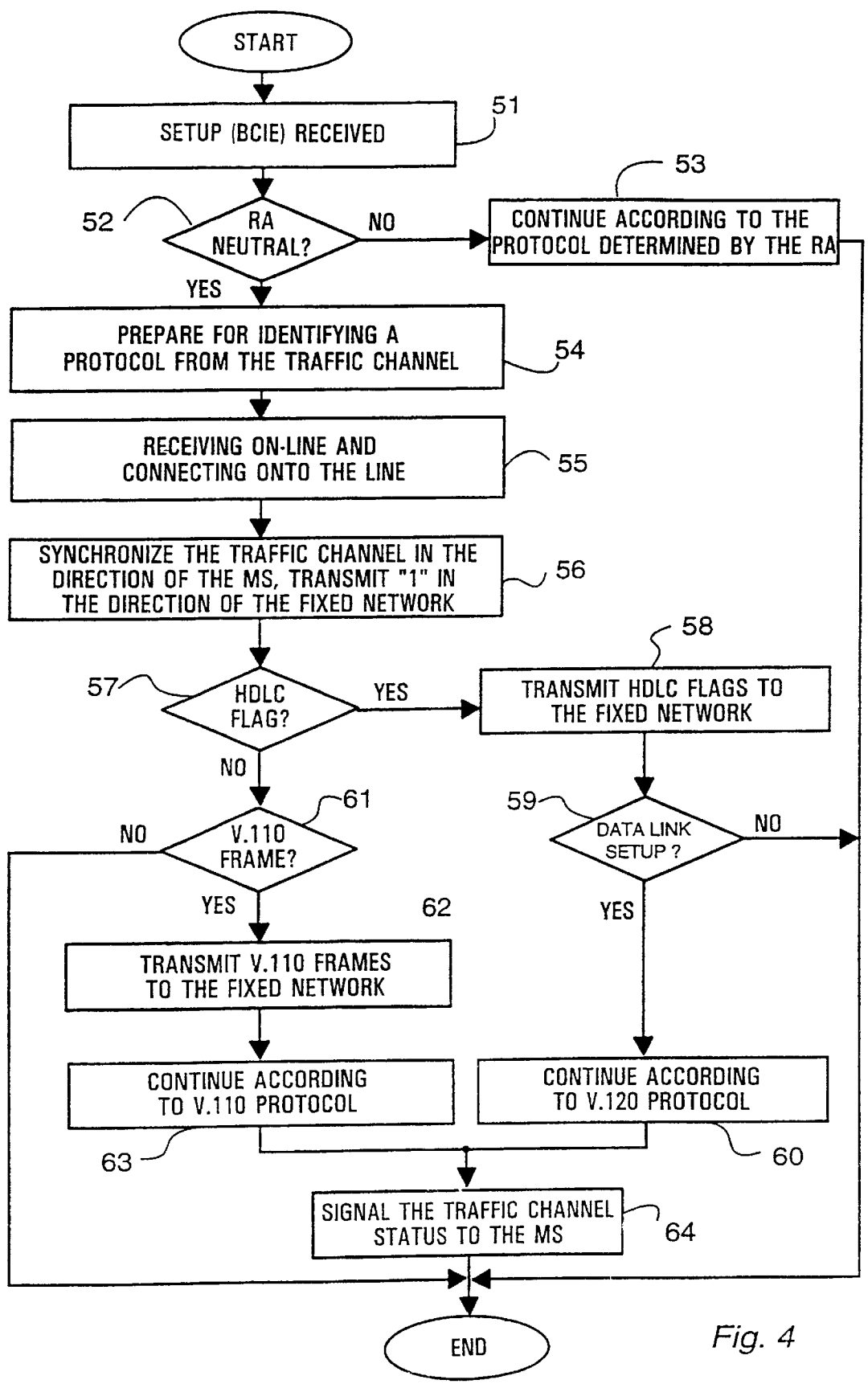
FIG. 4 is a flow chart illustrating monitoring of the traffic channel and identifying the protocol carried out by the IWF.

In step 51 in FIG. 4, an IWF control unit 41C (FIG. 2) receives from call control 42 of the MSC a SETUP message that contains the BCIE. IWF control unit 41C analyses the BCIE and, upon detecting that the ITC is an UDI, assigns the call a DIU 41B. In addition, the IWF checks the value of the RA parameter (step 52). Provided that the value of the RA parameter is neutral or can be interpreted as neutral, e.g. V.110 or V.120, the IWF control unit does not configure the DIU 41B for any protocol, but prepares for monitoring a traffic channel received from the fixed network (step 54). Provided that, in step 52, it is detected that the value of the parameter RA is other than neutral or it cannot be interpreted as neutral, the IWF control unit 41C configures the DIU 41B in accordance with the protocol (53) determined by the parameter RA. Again with reference to FIG. 3, the IWF acknowledges the allocation of the resources with a message 'acknowledgement'. The MS report with a message 'alerting' that alerting the calling subscriber has been started. The MSC, in turn, transmits the calling terminal equipment TE of the fixed network a message 'address complete' indicating that the connection has been established. The MSC then transmits a message 'connect' indicating that the called subscriber accepts the call, as a result of which the MSC transmits a message 'answer signal' to the calling terminal equipment TE. The MSC then controls the IWF with a message 'device on line'. It is thus returned to the operation of the IWF in accordance with the invention, described in FIG. 4.

Again with reference to FIG. 4, the IWF control unit 41C (FIG. 2) receives from the call control 42 of the MSC a message 'device on line', as a result of which it connects the DIU 41B between the traffic channel received from the GSW21 BSS and the traffic channel received from the PSTN, as shown in FIG. 2 with a broken line. Following this, the operation of the IWF continues in accordance with the flow chart in FIG. 4.

With reference to FIG. 4, after the IWF has been connected onto the line, synchronization of the GSM traffic channel is carried out between the TAF and the IWF in the usual way, and the IWF control unit 41C starts to monitor the traffic channel received from the fixed network by means of the DIU 41B. The DIU 41B may thereby transmit a string of 1-bits to the traffic channel in the direction of the fixed network because this procedure is the same regardless of whether the calling terminal equipment TE employs a V.110 or V.120 protocol (step 56). Subsequently, the IWF control unit 41C checks whether the signalling received from the terminal equipment TE contains a frame flag typical of V.120 protocol, that is, a HDLC flag 01111110 (step 57). If it does, this is followed by signalling according to FIG. 3B.

The IWF transmits HDLC flags to the terminal equipment TE of the fixed network (step 58, FIG. 4). As transmitting HDLC flags may be a part of some other protocol than V.120, the IWF control unit 41C checks in the preferred embodiment of the invention whether a data link setup message characteristic of the V.120 protocol is received from the terminal equipment TE (step 59). If the data link setup message is received, the IWF control unit 41C configures the DIU 41B to employ the V.120 protocol, and the IWF begins to operate in the direction of the fixed network in the manner required by the V.120 protocol (step 60). This includes transmitting an acknowledgement to the data link setup message to the terminal equipment TE. Thereafter, the IWF signals a normal traffic channel status to the NS, and data transfer may begin (step 64).

If the data link setup message is not received in step 59, protocol identification is regarded as failed in this embodiment of the invention, and it is proceeded to the end.

Provided that the HDLC flag is not received in step 57 of FIG. 4, the IWF control unit 41C checks whether the signalling received from the fixed network contains a V.110 synchronization frame (step 61). If a V.110 synchronization frame is received, signalling proceeds in the manner described in FIG. 3C. In other words, after identifying V.110 protocol by means of the V.110 synchronization frame, the IWF control unit 41C configures the DIU 41B in accordance with the identified V.110 protocol. Thereafter, the IWF transmits V.110 synchronization frames to the terminal equipment TE to the fixed network (step 62, FIG. 4). The IWF then continues the operation in accordance with V.110 protocol in the direction of the terminal equipment TE (step 63) and signals the status of the traffic channel to the MS in the usual way by using V.24 statuses (step 64).

In case a V.110 frame is not received in step 61, protocol identification is interpreted as failed in this embodiment and it is proceeded to the end.

The figures and the explanation associated therewith are only intended to illustrate the resent invention. In its details, the invention may vary within the scope and the spirit of the attached claims.

I claim:

1. A method and arrangement for establishing a mobile-terminating call in a mobile communications network when the call is received from a calling party via a fixed network without any signalling support carrying information on a protocol employed by the calling party, comprising:

receiving a call to a directory number of a subscriber, said directory number being assigned to a data service employing two or more alternative protocols for a fixed network, retrieving from subscriber data a service definition linked with said directory number, a protocol parameter of said service definition having a neutral value or a value that is interpreted as neutral, assigning an interworking function resource in accordance with said service definition, omitting the definition of a protocol due to said neutral value or the value that is interpreted as neutral, monitoring by the assigned interworking function resource a traffic channel received from the fixed network, identifying the protocol employed by the calling party on the basis of signalling characteristic thereof, and configuring said assigned interworking function resource to employ said identified protocol for said calling party.

2. The method as claimed in claim 1, wherein the identifying further comprises identifying the protocol of the calling party as a CCITT V.110 rate adaptation protocol provided that a V.110 synchronization frame is received from the traffic channel, configuring said assigned interworking function resource to employ V.110 protocol.

3. The method as claimed in claim 1, wherein the identifying further comprises identifying the protocol of the calling party as a CCITT V.120 rate adaptation protocol provided that a V.120 frame flag is received from the traffic channel, configuring said assigned interworking function resource to employ V.120 protocol.

4. The method as claimed in claim 1, wherein the identifying further comprises receiving from the traffic channel a V.120 frame flag, transmitting V.120 frame flags to another traffic channel, identifying the protocol of the calling party as a CCITT V.120 rate adaptation protocol provided that a data link setup message according to V.120 protocol is received from the traffic channel, configuring said interworking function resource to employ the V.120 protocol.

5. An arrangement for establishing a mobile-terminating data call in a mobile communications network when a call is received from a calling party via a fixed network without signalling support that carries information on a protocol employed by the calling party, comprising:

the subscriber database of a mobile communications network having one directory number defined for a subscriber's data service that employs two or more alternative protocols for a fixed network, a protocol parameter of a service definition linked with said directory number having a neutral value or a value that is interpreted as neutral, the mobile network assigns, in a mobile-terminating call to said directory number, an interworking function apparatus according to the service definition, omitting the configuration of a protocol employed for the fixed network due to the neutral value of said protocol parameter or the value that is interpreted as neutral, said assigned interworking function apparatus monitors a traffic channel received from the fixed network, to identify the protocol employed by a calling party on the basis of signalling characteristic thereof, and to configure itself to employ said identified protocol for said calling party.

6. The arrangement as claimed in claim 5, wherein the protocol employed by the calling party includes a CCITT V.110 rate adaptation protocol, and said signalling characteristic of the protocol containing a V.110 signalling frame.

7. The arrangement as claimed in claim 5, wherein the protocol employed by the calling party includes a CCITT V.120 rate adaptation protocol, and said signalling characteristic of the protocol containing a V.120 frame flag or a V.120 data link setup message.

8. An interworking function apparatus of a mobile communication network for achieving a protocol adaptation when a call is received from a calling party via a fixed network without signalling support that carries information on a protocol employed by the calling party, comprising:

an interworking function apparatus assigns, in a mobile-terminating call, interworking function resources according to a service definition obtained from a subscriber database, omitting the configuration of a protocol employed for a fixed network if a protocol parameter of said service definition has a neutral value or a value that is interpreted as neutral, the assigned interworking function apparatus monitors a traffic channel received from the fixed network, to identify the protocol employed by the calling party on the basis of signalling characteristic thereof, and to configure said assigned interworking function resources to employ said identified protocol for said calling party.

* * * * *